Patented Apr. 29, 1930

1,756,819

UNITED STATES PATENT OFFICE

CARLETON ELLIS AND JOSEPH V. MEIGS, OF MONTCLAIR, NEW JERSEY; SAID MEIGS ASSIGNOR, BY MESNE ASSIGNMENTS, TO SAID ELLIS

RESINOUS PRODUCT, SHELLAC SUBSTITUTE, ETC., AND PROCESS OF MAKING SAME

No Drawing. Application filed December 15, 1919, Serial No. 344,871. Renewed July 22, 1929.

This invention relates to bodies of a resinoid non-crystalline plastic nature produced by chemical synthesis and particularly to resinous bodies which are generated by chemical reaction. There are in general two classes of bodies which are used to effect the desired reaction, inorganic and organic chlorides, acid chlorides and chlorine derivatives represent the one class and the other class includes phenols, phenoloid bodies, organic acids, unsaturated organic substances and other bodies which are adapted to produce resinous and colloidal substances having the properties desired, all as will be hereinafter described and as claimed.

In the present stage of the art there are certain properties in resins which may be used as a basis of judgment in determining the suitability and desirability of the resinous bodies for the purpose for which they are to be used. These are hardness, toughness, freedom from coloring matter, resistivity to the action of water and aqueous solutions, chemical stability concerning the action of heat and chemical reagents, high melting point, solubility in organic solvents particularly alcohol and similar solvents, freedom from odor, absence of disagreeable taste, availability in large quantities at a relatively low cost. This invention is aimed directly at securing these desirable properties in the products which will hereinafter be described.

Referring to the class of substances hereinabove described as phenols, phenoloid bodies and the like there may be used for the purposes of the present invention ordinary phenol or carbolic acid, its homologues the monocyclic cresols. Also dicyclic bodies of the nature of naphthol and its homologues sometimes may be used. Di- and tri-hydric phenols may in some instances be employed such as orcinal, resorcinol, pyrogallol. Many of the poly-hydric hydroxy derivatives of naphthalene and anthracene possess reactive qualities. Furthermore substitution products of the above mentioned types of substances may be used, for example nitro, chloro, bromo, iodo, sulphonic, carboxylic and alkyloxy such as methoxy, and ethoxy derivatives. This class of substances comprises those bodies which may be used as one of the two general classes of reacting bodies and will herein be designated as the first class for purposes of clearness in the subsequent description. Such compounds can be embraced in the term "a phenolic body."

The second main type or class of reacting substances refers usually to a reactive inorganic or organic body whose molecular weight and constitution is such that when suitably caused to react with a body belonging to the first class of substances mentioned, will produce a resinous body having desirable properties. The second class of substances may comprise inorganic or organic halides or acid halides. As examples of such reactive substances there may be mentioned the halides or acid halides of non-metals for example the halides of sulphur, the oxyhalides of sulphur and the corresponding derivatives of phosphorus, selenium, antimony, bismuth etc. This class of substances also comprises inorganic chlorides such as aluminum chloride, mercuric chloride, ferric chloride. As examples of organic bodies comprised in the class which is being described acetyl chloride, carbonyl chloride or phosgene and bodies of similar reactivity may be mentioned.

Where reaction takes place between a reactive halide and a phenoloid body or other organic body possessing hydrogen atoms which are sensitive and reactive under the conditions established it will be found that a hydrogen halide acid for example hydrogen chloride will usually be evolved and it is one of the objects included within the scope of the present invention to produce hydrogen halide acid of such a strength and condition of purity that it may readily be employed in chemical processes. It is also one of the objects of the present invention to produce hydrochloric acid in an inexpensive manner and readily available condition.

Inasmuch as phenol and its homologues the cresols are readily available in large quantities and at the same time are relatively inexpensive, the description concerning the preferred modifications of the invention relates principally to these bodies as representatives of the general class of substances hereinabove mentioned. For the same reasons of economy and availability the second general class of reactive bodies hereinbefore described is, in the description referring to the preferred modification of the invention represented by the halides of sulphur notably sulphur chloride.

Referring again to the properties hereinabove mentioned which are designated as properties constituting the desirability of resinous bodies and resins it is not always necessary for certain purposes that a resin or group of resins combine all of these properties. For example in some cases it is primarily a necessity that the resin should be hard and tough and at the same time soluble say in alcohol. It may not be necessary that the resin should be one that, for this particular purpose, is light colored. On the other hand under some circumstances the prime necessity may be hardness and the possession of a high melting point combined with freedom from color. A high degree of toughness in the latter case may be a secondary consideration, freedom from color being much more important.

In carrying the invention into effect the details of execution have been found to exert an important effect upon the properties of the resulting substance. The presence or absence of solvents and extending media and the proportion of reacting substances used exert a profound effect on the reaction. For example sulphur chloride and commercial cresol may be brought together gradually in the proportions of about equal parts by weight and the result may be a hard resin (hereinafter called an "organic sulphide resin" for brevity), but it will usually be found that the product is very dark in color. These same proportions may be used in the presence of a greater or smaller amount of organic solvent such as benzol or carbon bisulphide or carbon tetrachloride, and it will be found that on eliminating the solvent used that the residue is of a soft sticky consistency although it may well be that this soft sticky product possesses a color much lighter than the hard product produced with the same proportions of reagents in the absence of a solvent medium. Again it may be found that by dissolving say 120 to 200 parts by weight of sulphur monochloride in benzol and adding this solution in fractions, or gradually to a solution of 120 to 200 parts by weight of commercial cresol or cresylic acid in benzol and finally eliminating the solvent, a hard resinous body is produced as the crude product, which however may possess under some conditions a reddish color or possibly reddish-yellow color. This reddish-yellow resin may upon the application of heat, represented by a temperature of say 150 to 200° C., partially decompose and assume a very dark almost black color. The same crude product when submitted to a suitable bleaching and neutralizing or stabilizing treatment may on the other hand safely withstand heating without suffering the decomposition and darkening mentioned above.

As further examples of the effect of the method of carrying out the resin-forming reaction reference is again directed to the above statement wherein it was set forth that the result of a chemical reaction between substantially equal parts by weight of sulphur monochloride and commercial cresol or cresylic acid might lead to the formation of a dark colored resin. By the use of a suitable extending and modifying agent which may comprise water or other aqueous extending or emulsifying agents the reaction may be so modified that the resinous body produced possesses improved properties, among which may be particularly noted, relative freedom from dark coloring matter.

The use of suitable reacting conditions other than a mere choice of reacting substances as well as suitable purifying, modifying and stabilizing after-treatments are important considerations from the point of view of obtaining products which are suitable to the trade in the present stage of the art.

The invention in one of its phases includes the use of water and aqueous solutions as solvents or extending media for the (for example) cresol. One of the disadvantages of carrying the reaction into effect in the absence of solvents or extending media is that toward the end of the reaction the viscosity of the reaction mass becomes so great that stirring of the same is difficult. As a result of this increase in viscosity further additions of the resinifying or reacting agent tend to concentrate without being distributed through the reacting mass with the result that it is difficult to obtain uniform results in parallel operations. A further disadvantage is that the coloring matter which forms appears to be of a more concentrated and intractable (that is stable) nature than in the case where the reaction is modified by the presence of an extending agent. The use of water to serve as a dispersing medium has several advantages. It prevents an undue rise in temperature which has been found to be coincident with the formation of dark colored bodies and the temperature can be readily controlled and kept at different points by the use of water whose temperature is correspondingly controlled and graded. Water represents therefore a means for controlling temperature internally or directly. Secondly the hydrochloric acid or hydrogen chloride which is produced by the action of (for example) sulphur monochloride on commercial cresol which is emulsified with water dissolves in that water and produces directly a solution of hydrochloric acid the strength of which can be controlled by varying the amount of water used as an emulsifying or dispersing medium. This method of recovering the hydrochloric acid produced during the reaction obviates the necessity for employing special absorbing means externally of the reacting system and this in turn involves a decrease in manufacturing costs. It might be thought that the use of water in this respect would lead to serious decomposition and wasteful hydrolysis of the sulphur monochloride but it has been found that in the presence of a reactive body like cresol that the sulphur chloride is not seriously decomposed. This effect may easily be explained by the fact that the rate of reaction between the sulphur chloride and the cresol is much greater than that between the sulphur chloride and water. Although the sulphur chloride does not appear to lead to the formation of any appreciable amounts of products of hydrolysis with water there is some reason to believe that the water enters in some way into the reaction between sulphur chloride and commercial cresol since the resinous products produced in this way have a tendency to be tougher than those products produced without the use of a solvent or extending medium and also tougher than those products made by the use of anhydrous solvent media.

(In the following examples, parts by weight or parts by volume mean kilograms and litres respectively on the one hand and on the other hand grams and cubic centimeters, as the case may be.)

*Example 1.*—We emulsified 500 parts by weight of cresol (97% tar acids) with 2500 parts by volume of water and 300 parts by weight of crushed ice. We added in a slow stream 675 parts by weight of sulphur monochloride. In order to purify, the product was kneaded in hot water, cooled, powdered, partially air dried and then dried in pans in thin layers at 70 to 80° C. This product was very largely soluble in ordinary alcohol in the cold also in methyl acetone, alcohol-benzol mixtures, partly soluble in benzol, partly soluble in cold caustic soda, completely soluble in hot caustic soda. It will be noted that the proportion of sulphur monochloride to cresol was 135:100. When the sulfur chloride was all added, the resin separated as a yellow mass, leaving a solution of hydrochloric acid as a by-product.

The resinous product although washed with hot water had a tendency on melting and heating to turn dark.

One of the important phases of the invention is concerned with the bleaching, purification and stabilization of crude products for example, as prepared in the example cited above. One method of effecting purification and extracting coloring matter consists in kneading the resinous product with an alkaline substance which will neutralize hydrochloric and other mineral acids and at the same time extract coloring matter from the resinous body. It appears that a part at least of the coloring matter consists of an acid substance whose acid properties are stronger than those of the resinous body. That is to say a hot dilute solution of a weak alkali for example sodium carbonate will extract coloring matter without dissolving the lighter colored resin.

*Example 2.*—We made an emulsion of 500 parts by weight of redistilled water white cresol (cresylic acid 97% tar acids) with 625 parts by volume of water and 625 parts by weight of ice. This emulsion was vigorously stirred and into it was gradually run 650 parts by weight of pure sulphur monochloride (130% based on the weight of the cresol). At the end of the operation that is when all the sulphur chloride had been added the resin separated in a light colored mass leaving as a residue or by-product a solution of hydrochloric acid.

Neutralizing and bleaching. The resin as produced above was kneaded with three portions (1500 parts by volume each) of 3% sodium carbonate solution. The first two kneadings extracted blue coloring matter but the third portion of carbonate did not remove any dyestuff or coloring matter. The resulting resin was washed thoroughly with hot water.

Hereinafter those resins produced by reactions in which water or aqueous solutions are used as extending media will be designated as "water medium" processes. Instead of washing the product by kneading in hot water this may be done by cooling the crude product, powdering it and thoroughly grinding or mixing it with sufficient cold water, in several portions, to dissolve traces of mineral acids.

In place of sodium carbonate other weak alkalies for example ammonia or alkaline ammonium salts may be used. Other methods of effecting a bleaching and stabilizing action may be employed, for example the resin may be dissolved in an excess of sodium hydroxide solution and chlorine passed in so as to form sodium hypochlorite. In carrying out this reaction it will often be found that the action of the chlorine gas upon the alkaline solution will precipitate the resin. A solution of the crude product in caustic soda and fractional precipitation of coloring matter and light colored resin by means of mineral acids may be employed in order to isolate the resin substance.

The resin produced by the water medium process possesses the property of dissolving in alcohol and similar solvents as well as in benzol and its homologues and similarly acting solvents. It is particularly soluble in a mixture of alcohol and benzol. Its solubility in a simple solvent such as alcohol or benzol is closely related to the proportion of the substances which have been used in its production particularly the proportion of phenoloid body in relation to the amount of resinifying agent employed, for example, sulphur monochloride. In general at least 100 parts by weight of sulphur monochloride to 100 parts by weight of commercial cresol or cresylic acid is necessary to produce a hard resinous body. As the proportion of sulphur monochloride is increased above this ratio the hardness of the resin increases to some extent and simultaneously its solubility in a simple solvent such as alcohol or benzol decreases somewhat. The main difference however between its solubility in alcohol-benzol mixtures and in a simple solvent such as alcohol alone or benzol alone is that in the mixed solvents the resin yields a clear solution or "true" solution whereas in a simple solvent the solution is of a colloidal or suspensoid nature. In the examples cited above the ratio of sulphur monochloride to commercial cresol is approximately 135:100 and 130:100, respectively. This is a proportion which has been found to yield a resin after suitable purifying treatment which combines the properties of hardness, considerable toughness and a degree of solubility in alcohol comparable with that of shellac.

Since the chlorine of the sulphur chloride is very largely converted into hydrochloric acid during the reaction with the simultaneous generation of traces to small amounts of sulphurous and similar acids it is necessary to remove acid from the crude product. The treatment with alkali mentioned above accomplishes this neutralization.

The action of alkali on resins produced by any of the methods of the present invention is characteristic and the phenomena vary with the strength and nature of the alkali or alkaline material chosen. The fixed caustic alkalies particularly at somewhat elevated temperatures, say about 60° C. are found completely to liquefy or dissolve the resin in contact therewith. At the ordinary temperature the fixed caustic alkalies exert a very marked dissolving action but it is not as complete as it is at higher temperatures. When for example sodium hydroxide solution is used as a solvent medium for the resin produced by the methods of the present invention, not only do the resin substances go into solution but also the coloring matter which has been found to be concomitant with the formation of resin or resins. Separation of resin from coloring matter can therefore not be accomplished by the use of the fixed caustic alkalies since their action does not differentiate between coloring matter and resin-substances, that is to say selective solvent or saponifying action is not exerted by sodium or potassium hydroxides. The only method which remains as a possible expedient so far as the caustic fixed alkalies are concerned consists in liquefying the resin with its coloring matter in solution or solutions of the fixed caustic alkalies and then fractionally precipitating the resin and the coloring matter by means of acids.

It is preferable however to make use of an alkaline substance which possesses a more selective action on the coloring substances themselves. This selective action is possessed by weak alkalies and alkaline substances among which class are comprised sodium carbonate, potassium carbonate, ammonia, and salts in general which have a weak alkaline action for example sodium borate, sodium silicate, sodium acetate, sodium oleate, sodium stearate and the like.

The use of dilute sodium carbonate in this connection has been hereinabove described. When sodium carbonate solution is used as a means for neutralizing free acid formed in the reaction and also for removing coloring matter from the resin substance it is necessary, after the resin has been extracted with sodium carbonate solution, to thoroughly wash the residual resinous mass with hot water or neutral salt solution in order to thoroughly remove from the plastic resinous mass traces and residua of colored sodium salts. If colored salts resulting from the action of solutions of sodium carbonate or similar substances are allowed to remain in the resin they cause the latter to assume a somewhat dark colored appearance.

To more fully explain the nature of the problem of removing coloring matter from resigns produced according to the methods of the present invention, it should be noted that it appears that the coloring matters or color generating substances which as hereinbefore stated are formed by a side reaction which takes place while the resinifying action is also proceeding, appear to be of an acidic nature and it may be also of a tautomeric nature inasmuch as the action of alkalies upon the color generating substances appears to deepen and modify the depth of shade. In this respect they may be of a character which suggests their analogy with bodies of the nature of phenolphthalein.

In some instances it is desired chiefly to remove from the resin, acids of the nature of hydrochloric acid and including hydrochloric acid which have been formed in the resinifying reaction. This removal of acid may take place by treating the resin with hot water or neutral saline solution which renders the resin plastic and workable. The addition to the mixture of plastic resin and hot aqueous solution of a neutralizing and ant-acid material preferably one which does not cause the deepening in the shade of the coloring substances in the resin. Zinc oxide or hydroxide is a good example of such a neutralizing agent which does not affect the color and which does not therefore involve such a thorough washing as an after or final treatment as is necessary in the case where an alkaline substance is used, the alkaline strength of which is sufficiently great to cause a selective action on the coloring substances. In addition to zinc oxide other oxides and hydroxides possessing an equivalent or analogous action may be used.

As an example of the application of ant-acid material which does not affect the color of resin the following illustration of the application of oxide of zinc to the purification of resin produced by the water medium process according to the details in Example 2, is given.

*Example 3.*—This product was kneaded in boiling water to which 200 grams of oxide of zinc were gradually added. The kneading was continued for two hours in this bath. The product was removed from the bath and excess aqueous matter squeezed out. On cooling a hard yellow product was obtained remarkably similar in appearance to a "hank" of bleached shellac.

In the present stage of the art it is quite common for spirit varnishes to appear upon the market which contain resins or mixtures of resins dissolved in alchol. One of the objects of the present invention is to secure resins of such properties that by treatment for a suitable length of time with alchol they go readily into solution to yield spirit varnishes; and having secured this alchol solubility, advantage is taken of this fact to bring about refining, stabilizing and neutralizing treatment after the resin or resins produced by the methods of the present invention have been treated with alcohol as a solvent and dispersing vehicle.

The following example is given showing the method of procedure involving the steps of making the resin, recovering hydrochloric acid during the resinifying reaction, dissolving the final resinous mass in alchol and submitting the latter to a refining, neutralizing and stabilizing treatment. Although the example is concerned with the handling of a product made according to the water medium process it is to be understood that products made according to other methods of the invention may also be submitted to the same treatment.

*Example 4.*—Made an emulsion (consisting of (1) 500 parts by weight of water white cresol, (2) 1250 parts by weight of a mixture of water and cracked ice). This emulsification was effected merely by efficient stirring. The stirring was continued and 600 parts by weight of carefully redistilled sulphur monochloride was continuously added in the form of a thin stream to the emulsion of cresol, water and ice. When the sulphur chloride had all been added resin separated as a yellow mass. It was kneaded and washed with hot water to remove a certain quantity of free acid. It was cooled, broken up into small pieces or particles and air dried. 584 parts by weight of the air dried product were powdered and treated in a shellac tumbler with 600 parts by volume of denatured alcohol. At the end of 6 hours a homogeneous milky solution with a slight acid reaction was obtained. Add 5 parts by weight (about 1 per cent of the weight of the air dried product) of oxide of zinc. This solution showed on standing the remarkable property of retaining all of its viscosity, that is practically nothing settled out except the oxide of zinc.

As a good illustration of the difference between the effect of an ant-acid such as oxide of zinc and an ant-acid like calcium carbonate it may be mentioned that a portion of the same solution referred to above which was treated with oxide of zinc was also treated with alkaline calcium carbonate sludge (i. e. sludge containing calcium carbonate and some sodium carbonate and caustic soda, formed in causticizing soda) and this latter portion compared with the main body of alcoholic solution which had been treated with oxide of zinc. At the end of three days the alcoholic solution which had been treated with the alkaline calcium carbonate sludge had become very dark colored, almost black whereas that which had been treated with oxide of zinc had remained light colored. It may be mentioned that the alkalies, the alkaline earth hydroxides and oxides and salts of the alkalies and alkaline earths have an action on resins produced by the methods of the present invention similar to the effects noted in the case just mentioned in connection with the carbonate sludge. It will be noted here that this formation of dark color by the action of sodium carbonate took place in a solution which contained appreciable quantities of water that is to say in an alcohol solution. The development of color in the resins produced by the methods of the present invention through the action of alkaline substances may be taken advantage of as hereinbefore described in the selective elimination of that coloring matter. It is to be observed, however, that this color development is closely connected with the presence of water or moisture. When on the other hand moisture is present in very small quantities, for example when dry resin is dissolved in an anhydrous solvent such a substantially anhydrous resin solution may be thoroughly treated with an alkaline substance like sodium carbonate, calcium carbonate or equivalent substances and under such substantially anhydrous conditions the development of color will be negligible or at any rate of a much smaller order of magnitude than in the case where substantial quantities of water or moisture are present.

The modification of the invention hereinabove referred to and exemplified as stated under the general term of "water medium method" has in examples previously described been concerned chiefly with the controlled addition of a liquid resinifying agent for example chloride of sulphur to an emulsion of a phenolic body or mixture of bodies with water or aqueous medium. There are other modifications of this phase of the invention which may be employed for example an emulsion of cresol and water may be atomized and sprayed into a suitable reaction chamber and into this stream or current there may be injected in the form of a mist or in an atomized condition controlled quantities of the resinifying agent chosen, for example sulphur chloride or bromide. This is a method of carrying out the reaction with the reagents in the form of mists and vapors, under such conditions the by-product acid formed, which will be hydrochloric acid where sulphur chloride is the resinifying agent used, may continuously be withdrawn from the reaction chamber and delivered into suitable absorbers or containers, the resin substance will be precipitated upon suitable baffles situated in the reaction chamber.

In carrying out the reaction in the liquid phase as exemplified by the specific examples cited above it is sometimes advantageous to limit the quantity of water which is within the reacting zone at any given time. That is to say where the quantity of water chosen as an extending medium is such as to yield as one of the products of the reaction an acid solution, say a solution of hydrochloric acid of full strength, that is to say 37–38% by weight, this quantity of water may gradually be emulsified with the phenolic body under treatment while the resinifying agent is gradually added to the reaction mixture. An example will serve to make this clear. The following quantities of reacting substances were taken: Cresol (97% tar acids, straw colored commercial) 100 parts by wt. Sulphur monochloride (crude 94% $S_2Cl_2$) 1400 parts by weight. Water 1000 parts by weight (calculated to yield a 37% hydrochloric acid solution).

The cresol was placed in a closed vertical cylindrical reaction vessel and vigorously agitated. Water was run slowly into one part of the vessel at about the same rate at which the sulphur chloride was run into the opposite part of the vessel. When all the sulphur chloride and water had been added two products were obtained, a mass of yellow resin and a solution of hydrochloric acid. The acid was found to contain less than one-tenth per cent of $SO_2$ by weight.

It has been set forth above, that the reason for carrying out the resinifying action in the presence of an extending or solvent medium is for the purpose of contributing to the product properties which it would not otherwise possess and among these may be mentioned light color and hardness. The use of water as an extending, modifying and dispersing medium has been hereinabove described. It has been shown that the product made according to the description set forth in the specification produces a yellow resin which is soluble in alcohol, in a manner comparable to that of shellac and the method of carrying the reaction out in such a way as to obtain not only a comercial resin but also a valuable by-product, for example, hydrochloric acid has been described.

The resin produced may be applied to those uses to which hard resins with a considerable degree of toughness ordinarily are put. One of these uses resides in the production of suitable varnish films. Since the resin is soluble in alkalies advantage may be taken of this fact to produce water soluble solutions of the resin for use as paper sizings, as constituents of shoe polish, antiseptic soap ingredients and for similar purposes. The resin, as such, may also advantageously be used to impart "body" and other desirable qualities to chewing gum.

In making a solution of the product prepared by the methods of the water medium process with the use of alcohol such as ethyl alcohol, methyl alcohol, mixtures of these bodies and including higher liquid alcohols and solvents substantially equivalent in properties to the foregoing substances it is important that the product of resinification be at least partially free from water. If the product is in a moist condition it may be found that on treatment with the above named solvents for example, ethyl alcohol or denatured ethyl alcohol that the resin, although previously capable of being powdered or ground into small particles, will on treatment with the alcoholic solvent show a considerable repulsion or incompatibility with said solvent, whereas if the resin be previously freed from loosely held moisture for example by the process of grinding into small particles and exposing to the air, that is to say by air-drying, that in the latter case treatment with alcohol will effect the solution of a greater portion of the resin. The use of air-drying mentioned above is only one of several methods for accomplishing the removal of water. The drying or partial dehydration may for example take place with the aid of well known methods for drying shellac and other varnish gums and substances of a similar nature. The more or less wet resinous product, produced by the above described methods of the present invention may be spread out so as to present a large surface and may then be exposed to atmospheric pressure or vacuum with or without the application of a limited amount of heat. In other words the drying of the resin may take place by any method which will remove a substantial amount of water and moisture without affecting the desirable and valuable properties of the resin.

The amount of drying necessary may vary within wide limits depending upon the after treatments to which the product is to be submitted. When the resin for example is to be placed in a resin dissolving device such as a shellac tumbler it is desirable to dry the resin in such a way that when said resin is broken up into small particles and treated in the hereinbefore referred to shellac tumbler that said particles of resin will not agglomerate but will continue to present to the action of the solvent a comparatively large dissolving surface. The extent to which it is necessary to dry the resin so that it will readily go into solution when shaken with alcohol or similarly acting solvent in a device substantially equivalent to a shellac tumbler may be determined by taking samples of the resin during the drying process, grinding these into small particles and shaking these small particles with ordinary alcohol in a bottle. If the resin is not sufficiently dry it will be found that these particles will agglomerate or roll themselves into a ball which goes into solution with exceeding sluggishness. This is an important consideration where the resinous product produced by the methods of the present invention is to be put into solution by shaking in the manner hereinabove described.

If on the other hand the practical limitations of the apparatus at hand are not confined to the use of shaking devices a resin which is in a more or less moist condition can be gradually gotten into solution by preventing the formation of the agglomerated mass hereinabove mentioned by the action of grinding or kneading mechanisms.

As an example of the production of a resin and the washing and drying of the same the following is given:

*Example 5.*—The yellow mass of resin resulting from Example 1, was found to be contaminated with hydrochloric acid, was kneaded in hot water, cooled, powdered, partially air-dried and then dried in pans in thin layers at atmospheric pressure at 70°–80° C. until the sample of the dried product, when ground into fine particles and shaken with alcohol, was found to be readily compatible with alcohol, that is to say showing no difficulty in going into solution in the alcohol. It should be noted that in drying with air the product made by the "water medium method" it is, for preparing a product to be dissolved in alcohol or similar solvent, not necessary to remove all the water contained in the crude product. The product as prepared in the above example contained an appreciable amount of moisture but eventually went readily into solution in alcohol on suitable treatment with the latter.

As hereinabove mentioned one of the properties of resins which the varnish manufacturer demands is relative freedom from coloring matter. This is particularly true of resins which are to be dissolved in volatile solvents for the preparation of spirit varnishes. This demand for a very light colored resin has given rise to the shellac bleaching industry. As previously mentioned the reaction between phenols and halides of sulphur leads to the formation of very dark colored substances. This color formation is modified and decreased to a certain extent by the use of extending and solvent media but for the preparation of resins which will meet exacting demands of the manufacturer of varnishes it is not sufficient merely to produce the resin in the presence of a solvent or extending medium. Bleaching and stabilizing treatments are sometimes of vital importance in the preparation of a commercial hard gum. In one of the modifications of the present invention in which water is used as an extending medium the reaction is carried out with the addition of and in the presence of a substance or substances which have the power to destroy organic tinctorial and coloring bodies. In other words the reaction is carried out in this particular case in the presence of a bleaching agent. It has been found that this bleaching agent should preferably be a reducing agent. As such reducing agents stannous chloride, sodium hydrosulphite and combinations of sodium hydrosulphite with formaldehyde, such as are known in the trade as "Rongalites" may be used. Zinc in comparatively finely divided form has been found to be particularly effective as a bleaching agent. This effect may be explained by the fact that zinc dissolves in the mineral acid produced within the reaction zone with the production of so-called "nascent" hydrogen in contact with the bodies which are producing coloring matter and in contact with the coloring matter formed during the progress of the reaction which produces the resin. At the end of the reaction more or less finely divided zinc is disseminated in the resin produced and even after the latter is washed with hot water these finely divided particles of zinc may remain in the resin during the process in which the latter is desiccated or dried and during this time further assist in the removal of mineral acid.

As an example of the method of carrying out the reaction with a reducing agent present in the reaction zone, the following is given:

*Example 6.*—500 parts by weight of cresol (97–99% tar acids) were emulsified with 1500 parts by volume of water containing a suspension of 100 parts by weight of finely divided zinc (zinc dust). 718 parts by weight of commercial sulphur monochloride (containing 94% $S_2Cl_2$ equivalent to 135% sulphur chloride on the basis of the cresol) were gradually and continually added to the cresol-water-zinc emulsion or mixture, the latter being efficiently agitated during and for a short time after the addition of sulphur monochloride. During the reaction hydrogen gas was evolved. After the sulphur chloride had been added the resin separated in the form of a light yellow mass which was filled with gas bubbles due to the evolution of hydrogen during the reaction.

It is to be understood that any other substance suitably capable of acting as a bleaching agent may be used instead of zinc.

The elimination of mineral acid from the resin in its various forms, that is to say, the preparation of the solid resin and solutions of the latter that are free from mineral acid is to be emphasized as being of particular importance in order to prepare a gum which on the one hand will be stable as regards heating and melting, that is to say will safely withstand elevated temperatures above its melting point, say 150 to 250° C., while still maintaining its light color, that is, not decomposing or blackening or charring under the conditions of such heat treatment and which on the other hand will be so free from mineral acids that when applied to wood or other vegetable and animal fibers that no decomposition of the latter will thereby be engendered. The elimination of mineral acid from the resin may take place while the latter is in the solid, semi-solid or plastic, melted, or dissolved condition. It is extremely important however to use for purposes of acid neutralization a substance which will not cause discoloration of the resin. In other words every ant-acid material will not answer the purpose. Previous mention has been made of the development and extraction of color by the action on the resin of certain alkalies and alkaline substances. Metallic oxides have been found to be of particular value as neutralizing agents. There are however certain metallic oxides which are excluded from use by virtue of the fact that they cause the formation of coloring substances. Oxide of iron is an example of this type. When oxide of iron for example is placed in contact with the crude resin in the solid, liquid, or dissolved state in the presence of the mineral acid which invariably is present in the crude product before the latter is refined, it will be found that contact of the oxide of iron with the acid containing resin gives rise to the development of highly colored spots which might ruin the resin from a commercial point of view. The ant-acid material preferably therefore should be one which will not affect the color of the product. Oxide of zinc is a good representative of those substances which act as very efficient ant-acids and at the same time do not injure the color of the resin. The resin may be kneaded in hot water containing the preferred ant-acid material and this kneading continued until mineral acid is thoroughly neutralized or the resin may be dissolved in a solvent such as alcohol or benzol and given thorough treatment with for example oxide of zinc. If the manufacturing process consists in the preparation of for example an alcoholic solution of the resin this alcoholic solution after thorough treatment with the color preserving preferred ant-acid material may be filtered or allowed to settle and a strictly neutral alcoholic solution decanted or recovered. Still another method consists in dissolving the resin in benzol preferably at a temperature somewhat elevated above room temperature say 40–70° C., treating this warm benzol solution with for example oxide of zinc, removing the ant-acid material either in whole or in part and utilizing the resulting solution as such for further purposes or evaporating off the benzol to obtain a residue of hard resin. It may sometimes be found advisable and even preferable to leave a certain small percentage of the ant-acid material in the resin to guard against the development of mineral acid say hydrochloric acid. The difference in desirable properties between a resin containing appreciable quantities or even traces of mineral acid and a strictly neutral resin which may be prepared by the present invention is remarkable. The former product on the application of heat rapidly undergoes spontaneous decomposition and if the heat is continued the result is a black or at any rate very dark colored worthless resinous tar. As an example of the stabilizing action resulting from a thorough removal of mineral acid from the resin prepared by the methods of the present invention the following is given. This example is concerned with the production of a resin by the action of sulphur monochloride on commercial straw-colored cresol containing 97-99% tar acids in the presence of benzol, the treatment of the solution with zinc and aqueous hydrochloric acid in order to bleach the resin contained in said solution. The thorough removal of mineral acid from the resulting benzol solution, and the subjection of the resulting hard product to elevated temperatures for the purpose of testing its stability.

*Example 7.*—650 parts by weight of crude sulphur monochloride containing 94% $S_2Cl_2$ (122% based on the weight of cresol taken) dissolved in 500 parts by weight of benzol were gradually added in fractions to 500 parts by weight of straw colored cresol (containing 97% of tar acids). The dry hydrochloric acid gas produced during the reaction was led into a chamber containing water and absorbed therein to produce a concentrated solution of hydrochloric acid. The reaction product in benzol solution was treated with 90 parts by volume of strong aqueous hydrochloric acid and shaken therewith, and to this mixture finely-divided zinc was added in small portions at a time using in all more zinc than would go into solution in the amount of hydrochloric acid employed. Shaking and warming were applied and maintained until the hydrochloric acid was considerably exhausted in strength. Separation of the benzol and aqueous layer was then allowed to take place by standing and a second treatment with fresh hydrochloric acid and zinc, similar in all respects to the first bleaching treatment, was applied and the benzol solution again separated by standing. 10 parts by weight of oxide of zinc was then added to the benzol solution and stirred vigorously with the latter. The solution was then tested for acidity with litmus and found to be free from acid. As much oxide of zinc as would separate from the viscous benzol solution on standing for 6 hours was allowed to deposit, the benzol solution containing a small amount of oxide of zinc in suspension (less than 1% of the weight of the resin) was then placed in shallow pans and heated to 125-140° C., until the benzol was thoroughly evaporated.

It was found that this product could be heated to a substantially higher temperature without darkening or decomposition as is the case in products containing even a trace of mineral acid.

As a further example illustrating the stabilizing action resulting from thorough treatment with an agent which thoroughly removes mineral acid from the product the following is given:

*Example 8.*—500 parts by weight of straw colored cresol dissolved in 500 parts by volume of benzol were treated with a weight of sulphur monochloride (dissolved in 500 parts by volume of benzol) the equivalent to 120% by weight of the cresol. This product in benzol solution was treated with zinc and hydrochloric acid in the manner indicated in the previous example. The resulting bleached solution was thoroughly treated with oxide of zinc and then evaporated on the hot plate. It was found that a hard light colored resin was produced which safely withstood heating at elevated temperatures say up to 250° C., without darkening.

In order clearly to point out the effectiveness of contributing to the resin the property of stability toward the action of heat this stabilizing action resulting as hereinbefore described by the suitable employment of a stabilizing and ant-acid material, comprising oxide of zinc or equivalent material the following example is given wherein such stabilizing, neutralizing treatment is omitted and wherein in consequence of this omission the resulting resin due to the presence of material which would have been removed by the stabilizing and neutralizing treatment decomposes upon heating with a rapid development of dark color and with a substantially rapid transition from a comparatively light colored resin to a dark colored tarry mass.

*Example 9.*—(To be compared with Examples 7 and 8) 500 parts by weight of redistilled commercial cresol containing 97% of tar acids were dissolved in 500 parts by volume of toluol. 640 parts by weight of sulphur monochloride (containing 6% sulphur as an impurity) were dissolved in 500 parts by weight of toluol. (Sulphur chloride to cresol ratio 120:100.) The sulphur chloride solution was run into the cresol solution in the form of a stream of small diameter. The hydrochloric acid gas produced during the reaction was allowed to escape into the atmosphere. Aqueous, hydrochloric acid was added to the resultant viscous solution and agitated therewith. Zinc dust was added in small proportions causing the evolution of hydrogen in contact with the resin solution. It was also noted that hydrogen sulphide was evolved. The treatment with zinc was continued with more or less constant agitation until it was plainly evident that a considerable degree of decolorization had taken place. The toluol solution was then separated from the zinc and hydrochloric acid and placed in shallow evaporating pans exposed to a temperature of about 100°-200° C. The stabilizing treatment with zinc oxide was omitted and it was found that after one hour's heating that the resultant resin had turned black.

The above examples serve to show clearly the necessity of obtaining the resin in such a condition that it is neutral or at least absolutely or sufficiently free from mineral acids or acid; otherwise on the application of heat the resin will break down with the production of a dark colored practically worthless product. This is a particularly important consideration when it is remembered that a considerable portion of varnish gums and resins are subjected to rather high temperatures, for example, in the process of manufacturing oil varnishes and in compounding resins with rubber and subjecting the resulting compound to vulcanizing temperatures.

As indicated in the last three examples an organic solvent is used in one of the modifications of the present invention in order to assist in controlling the reaction and also to assist in hindering the development of coloring substances. One of the objects of using an organic solvent as an extending and solvent medium is to obtain the halogen acid produced as a by-product in the form at least temporarily of a dry gas instead of in the form of an aqueous solution.

As example of the use of an organic solvent for the purposes hereinabove mentioned the following are given:

*Example 10.*—Dissolved 1000 parts by weight of straw colored cresol in 1300 parts by volume of benzol. Dissolved 2000 parts by weight of pure sulphur monochloride in 3000 parts by volume of benzol. The cresol solution was stirred and the sulphur chloride solution introduced therein slowly. A brown solution and a viscous precipitate were obtained. This precipitate was washed with several portions of benzol and found that on treating the precipitate with boiling water it (the precipitate) became harder and would not melt in the boiling water. Thereupon the precipitate was heated on the hot plate and it was found that on heating in this way for about 15 to 30 minutes that the precipitate became infusible.

*Example 11.*—500 parts by weight of straw-colored cresol were dissolved in 500 parts by volume of benzol. At intervals, 718 parts by weight of crude sulphur chloride (also dissolved in 500 parts by weight of benzol) were added. The reaction product was a dark solution and on standing for two hours it was noted that hydrochloric acid gas continued to be evolved and that a light colored mixture was obtained with the precipitation of resin. After standing for four hours the evolution of hydrochloric acid was about complete. The benzol was then poured off and the precipitated resin dried in shallow layers in pans by heating. The precipitated resin without any washing was dried in the manner indicated at 70–80° C., for four hours. The result was a hard resin possessing however a reddish tinge.

*Example 12.*—100 parts of weight of straw colored cresol were placed in a stone ware reaction vessel. 160 parts by weight of sulphur monochloride were diluted with an equal volume of benzol and this solution added at intervals to the cresol solution. It was noted that toward the end of the reaction the dark color which is formed by the first contact between the sulphur chloride and the cresol was not discharged so readily as it was toward the earlier part of the reaction and a somewhat dark colored solution was obtained as a final product.

In another modification of the invention an organic solvent is used which acts as a true solvent for the phenolic body and exerts its extending action. Instead however of recovering dry hydrochloric acid gas during reaction under these conditions, the presence of water is utilized to prepare a concentrated solution of hydrochloric acid in the case where chloride of sulphur is used as the resinifying agent. As an example of the method of combining the solvent and extending action both of an organic solvent like benzol and of an aqueous medium like water the following is given. In this example toluol is used instead of benzol.

*Example 13.*—500 parts by weight of straw-colored cresol were dissolved in 500 parts by volume of toluol and 200 parts by volume of water added. The mixture was stirred and 718 parts by weight of crude sulphur monochloride, dissolved in 500 parts by volume of toluol, were added to the cresol-water-toluol emulsion. After the sulphur chloride had been added the resin separated after the reaction mixture had stood for one hour in the form of an emulsion with toluol, leaving a solution of concentrated hydrochloric acid in the reaction vessel as a by-product. Somewhat more than 250 parts by volume of hydrochloric acid solution of 31% strength was recovered.

In that phase of the invention which deals with the use of an organic solvent as an extending medium limitation is not set by the use of benzol and similar hydrocarbons. Other solvents may be used such as carbon bisulphide, carbon tetrachloride and the like.

The use of a body such as benzol and similar hydrocarbons, carbon bisulphide, carbon tetrachloride and the like, modifies the reaction in such a way that a given quantity of sulphur halide for example sulphur chloride when caused to react upon a weight of cresol equal to or smaller than the weight of sulphur chloride, for example, sulphur monochloride tends to produce resins which after the thorough elimination of the solvent are softer than would be produced with the same proportions of reacting substances in the absence of the solvent. Thus it follows that within certain limits which will hereinafter be mentioned the reaction is different when a solvent of the nature specified above is used than when no solvent is used. Thus in other words, on this ground alone, it cannot be said that the only effect of the solvent is to act merely as a diluting agent. It has already been mentioned that when equal weights of sulphur monochloride and commercial cresol containing 97–99% tar acids are caused to react with each other that the result is a hard resin. When, however, the same reacting substances are used in the same proportion in the presence of benzol the resulting reaction mass, after thorough elimination of the benzol is a soft viscous balsamic mass entirely lacking in hardness.

It will be noted that one modification of the present invention is concerned with the bleaching or decolorization of the resinous bodies produced. The preferred method of accomplishing this bleaching effect, namely, by the action of a reducing agent which in the examples cited has been exemplified by zinc in the presence of mineral acid involves the important technical consideration that relatively dark colored phenolic bodies may be used as raw material to produce resins which are subsequently bleached or decolorized to a greater or lesser extent for the production of light colored resins. This is technically and economically important because the phenolic bodies are sold on a basis of and content of tar acids and consequently not on a basis of color. Material consisting largely or wholly of the pure tar acids vary from water white through the straw colored to reddish oils. Whereas commercial cresols containing but a relatively small percentage of tar acids, say 25%, are very dark, almost black oils, these dark or black oils command however, a very much lower price than the lighter colored materials. As a result of the bleaching described in the present invention it is possible to utilize not only the light colored phenolic bodies or cresols or cresylic acids as they are known in the trade but also the cheaper and darker colored varieties. Refined native shellac which is probably the best example of an alcohol soluble natural gum finds a large outlet in the manufacture of hats including straw hats. For application to straw hats the refined native shellac has to be subjected to a bleaching process. One of the principal objects of the present invention is to produce a synthetic light colored resin which when dissolved in an alcohol or similar body will produce a light colored spirit varnish which may be used as a shellac substitute and particularly as a substitute for bleached shellac for example in the manufacture of straw hats.

Another object of the present invention is to produce a light colored resin of such a degree of stability that it may be melted and subjected to a relatively high temperature above its melting point and in that state incorporated with drying oils, driers, other varnish gums and, optionally, pigments to produce oil varnishes and paints. Instead however of being melted and then incorporated with drying oils and drying oil derivatives the resin produced by the present invention may be dissolved in benzol or toluol or similar solvent and the drying oil or its derivative or mixtures thereof incorporated into said solution in the volatile solvents specified. Still another object of the present invention is to produce hard light colored resins which may readily be incorporated with chicle, and, optionally, other suitable resins or gums to produce mixtures suitable for the manufacture of chewing gum.

As mentioned at the beginning of the present specification it is one of the objects of the present invention to prepare a resin which when spread into the form of a film by means of a volatile solvent vehicle or by other suitable or equivalent means will furnish a film which possesses waterproof and water resistant qualities, that is to say will not turn white when exposed to water. In some cases it may be found desirable in obtaining this waterproofing property to incorporate vegetable or animal oils with the resin. Instead of the hereinbefore mentioned methods of effecting this incorporation the resin may be dissolved in alcohol and the waterproofing agent added to and incorporated in this alcoholic solution. Castor oil being readily soluble in alcohol is particularly suited for such a purpose and the following example will make clear the method of procedure followed in such a case.

*Example 14.*—50 parts by weight of an alcoholic solution of a hard resin made by the reaction between 120 parts by weight of sulphur monochloride and 100 parts by weight of straw colored cresol in the presence of water as an extending agent was taken. This alcoholic solution contained about 25 parts by weight of resin, 2 parts by weight of castor oil was dissolved in said alcoholic solution and the whole shaken very thoroughly. A thin coat of this spirit varnish was applied to quartered oak and allowed to dry. No tackiness was observed in the film after the latter had dried 24 hours. It was found that said film could then be rubbed safely with sand paper, a procedure which cannot be carried out with a rosin film. Three coats in all were applied, the last coat being allowed to dry one week. At the end of this time the sample of wood supporting the varnish film was immersed in cold water for 24 hours and then removed, whereupon it was found that the film was unaffected by this water treatment.

In the foregoing illustrations cresol has been mainly used as the reacting phenolic body but it should be understood that phenol or any other reactive phenolic body may be similarly employed. However in the preferred modification or embodiment the invention is especially concerned with the treatment of the lower phenols particularly ordinary phenol or carbolic acid and its immediate homologues, with sulphur chloride. In the specific embodiment of the invention which represents the preferred form, the chloride of sulphur employed is the monochloride which has distinct advantages over the dichloride. The monochloride is easier to handle, is less offensive to the workmen, and the reaction may be controlled more satisfactorily with the production of resinous material which in many cases is more easily bleached etc. The present invention therefore involves, specifically, in its preferred form, the application of sulphur monochloride. The reaction may take place in the presence of materials which, strictly speaking, are not extending agents such for example, as ordinary rosin or other resinous bodies which are capable of reacting with the sulphur chloride.

In preparing a product from the lower phenols even when care is taken with respect to temperature control, the use of an extending or diluting medium, and other precautions the resin obtained may possess a reddish color. This reddish tone is, as stated, undesirable in many cases and hence the bleaching action through treatment with a reducing agent as above set forth is used. This red coloring matter is highly resistant to most bleaching materials such for example as oxidizing agents but responds to reducing conditions yielding a resinous material of a yellow or straw color and the present invention embraces such a resin originally reddish in color which has been bleached to a yellow or straw color or even lighter to thus render it of much wider application in the arts than the red resin. The difficulty of bleaching the resin to remove this red color is remarkable, the coloring matter resisting the application of most bleaching agents as for example so powerful an agent as hypochlorous acid, commonly used in the production of bleached shellac is substantially without action on some of the forms of the resin of the present invention. Furthermore in the manufacture of enamels, lacquers and the like, hydrochloric acid should be carefully neutralized. While zinc oxide or zinc carbonate may be used, cheaper neutralizing agents are sometimes required and calcium carbonate which is free from caustic soda or other strong alkalies may be used to advantage. The carbonate may be kneaded into the plastic mass obtained in the production of the resin by the water emulsion procedure or the carbonate may be shaken up with a benzol or toluol solution of the resin. The use of calcium carbonate sludges containing other alkalies is generally speaking not to be recommended.

The invention thus comprises the use of a monochloride of sulphur with a lower phenol in the presence of a dispersing agent and particularly one which is capable of absorbing hydrchloric acid readily so that the temperature is prevented from rising excessively. The proportions of the sulphur chloride to the lower phenol are also matters of considerable importance, the preferred form of the invention involving the use of approximately one and one-third to one and one-half times as much sulphur chloride as phenol. The proportions preferably being in excess of equal parts by weight and preferably not exceeding two parts by weight of sulphur chloride to one part of phenol, although in some instances the amount of sulphur chloride may be substantially in excess of this proportion. With smaller amounts of sulphur chloride in equal parts by weight viscous, tacky masses are obtained in many instances which are of no value as resins for use in the varnish industry and the like but may have some application in other directions as for example in making certain kinds of plastic, sticky fly-paper and the like. The present invention is not especially concerned with such viscous or liquid products but involves more specifically the production of hard resins which may be used in the varnish industry to meet the requirements of that most exacting field. However, the application of bleaching and neutralizing steps referred to above may likewise apply to the soft masses obtained by using a minor proportion of sulphur chloride.

Another product coming within the scope of the present invention is a resinous product consisting of a solution of the resin in a suitable solvent. Such a solvent may in some cases be a hydrocarbon material or mixtures of hydrocarbons such as benzol, toluol, gasoline, turpentine and the like depending on the relative solubility of the resin in question but specifically or in its preferred modification relates to a solution of the resin in an alcoholic solvent by which is meant solvents of a generally alcoholic nature such as methyl or wood alcohol, ethyl or grain alcohol, denatured alcohol and related solvents such as acetone, methyl ethyl ketone, methyl acetone, various higher alcohols, such solvents being used singly or in combination or as mixtures to the extent desired. Hydrocarbons such as benzol or toluol may likewise be added to the alcoholic solution in some cases, preferably however in minor proportion. The resin employed is preferably one hard enough to be not readily scratched when applied as a coating and allowed to dry. In other words the finished or dried coating should not present a tacky surface or be so easily scratched that the solution would not serve as a substitute for shellac for many purposes at least. Preferably the resin employed should have very little red or brown color but should be rather of a yellow or straw colored tone. Solutions of the resin in the alcoholic medium are made up to the extent of about equal parts of the resin and the solvent which forms a good varnish basis. Other resinous substances such as rosin, manilla copal, or other copals or even shellac may be added to such solutions to the extent desired. A mixture of equal parts of the cresol resin, manilla copal and shellac may be employed in some cases. When the resin is prepared with say 130 to 150 parts by weight of sulphur chloride to 100 parts of cresol the product contains a small amount of material insoluble in alcohol and this may be filtered off or removed by centrifuging etc. leaving a light brown or yellow solution. In some cases, however, it is desirable to retain in the solution such insoluble material as the latter gives the product a turbidity somewhat resembling alcoholic solutions of shellac. The present invention comprises both the turbid and the clarified alcoholic solutions of the resin. The resin obtained by the foregoing is considerably heavier than water, for example, in one case having a specific gravity of 1.3 or 1.4 and resins made by this process are characterized by this high specific gravity as well as content of sulphur.

In addition to neutralizing the resin by treatment with basic materials which absorb the acid the resin may be left in an acid condition which is not prejudicial in many cases, by simply adding to the resinous material at some stage in the finishing operation an amount of a salt of a weak acid such as sodium acetate, sufficient to combine with the residue of hydrochloric acid present. Sodium chloride is thus produced and acetic acid, the latter in small amount having little or no deleterious effect for many purposes. The present invention therefore comprehends a resin of an acid nature which acid is not harmful to the resin in connection with the operations to which it will customarily be subjected in the course of its utilization commercially. Hence the expression in the claims "devoid of harmful quantities of mineral acid" may refer to a completely neutralized product or one which contains no harmful amounts of acid material.

To recapitulate the object of the present invention is to prepare a comparatively cheap synthetic alcohol-soluble resin which will conform to the demands of the varnish trade for a light colored alcohol-soluble resin possessing waterproof qualities and which will also safely withstand the severe treatment to which said synthetic resin may be subjected in manufacturing processes involving heating said synthetic resin and exposing it to relatively high temperatures. For the purpose of manufacturing a resin which will possess the qualities hereinbefore specified novel methods of procedure have been employed which may be divided into three preferred steps, these are 1. The employment of extending and dispersing media in the reaction zone for the purposes herein specified.

2. Bleaching the crude reaction products if dark colored.

3. Refining, neutralizing and stabilizing said products and placing them in a marketable condition.

This application is in part a continuation of our co-pending applications Nos. 313,820 and 321,183 filed July 28, 1919 and September 2, 1919, respectively.

What we claim is:—

1. The process of producing resin which comprises maintaining a body comprising a phenolic substance dispersed or extended by an aqueous dispersing or extending medium, bringing into contact with said extending substance a quantity of sulphur halide greater than the amount of the phenolic substance, and sufficient to convert substantially the entire amount of said phenolic substance into a solid resin and separating said resin from the extending medium and thereafter bleaching the resin.

2. The process of producing a resinous material which comprises treating a lower phenol with sulphur chloride the amount of the latter being sufficient to react with at least the major part of the phenol present and bleaching the resulting resinous product.

3. The process of making a resin which comprises reacting on a phenol containing not over seven carbon atoms, with sulphur monochloride and bleaching the product.

4. The process of making a resin which comprises reacting on cresol with sulphur monochloride and bleaching the product.

5. The process of producing a resinous product which comprises reacting on a phenol sulphur chloride and bleaching and neutralizing the resulting resinous material.

6. The process of producing a resinous product which comprises reacting on a phenol with sulphur chloride and bleaching the resulting resinous material.

7. In the production of a resin of relatively light color adapted for use in preparing varnishes the step which comprises treating a reactive phenolic body with sulphur chloride, separating the major portion of the hydrochloric acid formed, subsequently neutralizing the last traces of the acid and bleaching the product.

8. A product containing the reaction product of a phenol with sulphur chloride such product being in a bleached condition.

9. A resinous product containing the reaction products of a phenol with sulfur chlorid, such product being in a bleached condition, such product being sufficiently soluble in ordinary alcohol to allow the production of a 50% solution therein.

10. A bleached organic sulphide resin wholly free from mineral acid.

11. The process of making a sulfuretted phenol product which comprises maintaining 135 mols of a phenolic body having a single six carbon ring in a liquid condition in the presence of water, adding thereto more than 71 mols of sulfur monochloride and eliminating the odor from the reaction product by blowing the same with a deodorizing elastic fluid.

12. The process of making a resin which comprises maintaining a phenolic body having a single six carbon ring in a liquefied condition in the presence of water, gradually adding sulfur chlorid thereto, in a sufficient amount to directly form a solid resin, and purifying the resin product by treatment with steam.

13. A well bleached resinous material derived from a phenolic body having more than 6 carbon atoms and a sulphidizing reagent, such resinous material containing combined sulphur as a component, such resinous material being free from bad odor and taste, to permit its use as a component of chewing gum.

CARLETON ELLIS.
JOSEPH V. MEIGS.